United States Patent
Brown et al.

(10) Patent No.: US 10,023,457 B2
(45) Date of Patent: Jul. 17, 2018

(54) CONVERSION FITTING

(71) Applicant: Aquamira Technologies, Inc., Bellingham, WA (US)

(72) Inventors: Dennis Browning Brown, Logan, UT (US); Richard Oman Evans, Hyrum, UT (US)

(73) Assignee: Aquamira Technologies, Inc., Bellingham, WA (US)

( * ) Notice: Subject to any disclaimer, the term of this patent is extended or adjusted under 35 U.S.C. 154(b) by 1054 days.

(21) Appl. No.: 14/292,623

(22) Filed: May 30, 2014

(65) Prior Publication Data
US 2015/0316182 A1   Nov. 5, 2015

Related U.S. Application Data

(63) Continuation-in-part of application No. 29/489,976, filed on May 5, 2014, now Pat. No. Des. 733,847.

(51) Int. Cl.
| | |
|---|---|
| *B67D 7/02* | (2010.01) |
| *F16L 15/04* | (2006.01) |
| *F16L 33/00* | (2006.01) |
| *F16L 5/12* | (2006.01) |

(52) U.S. Cl.
CPC ............ *B67D 7/0288* (2013.01); *F16L 15/04* (2013.01); *F16L 33/006* (2013.01); *F16L 5/12* (2013.01); *Y10T 29/49828* (2015.01)

(58) Field of Classification Search
CPC .................................................. B67D 7/0288
USPC .............................. 285/219, 220, 12, 148.23
See application file for complete search history.

(56) References Cited

U.S. PATENT DOCUMENTS

| | | | | |
|---|---|---|---|---|
| 713,113 A | * | 11/1902 | Kraemer et al. ...... | B67D 1/0832 222/400.7 |
| 1,597,214 A | * | 8/1926 | Stenning ............... | F16L 27/047 285/143.1 |
| 1,976,817 A | * | 10/1934 | Walker ................. | H02G 3/0616 174/482 |
| 2,445,358 A | * | 7/1948 | Maechtlen .............. | F16L 41/10 285/149.1 |
| 2,926,935 A | * | 3/1960 | La Marre .............. | F16L 41/007 285/184 |
| 3,600,941 A | * | 8/1971 | Kammeraad .......... | G01L 23/26 141/367 |
| 3,606,399 A | * | 9/1971 | Zahuranec ............ | F16L 15/008 285/220 |

(Continued)

FOREIGN PATENT DOCUMENTS

| | | | | |
|---|---|---|---|---|
| WO | WO 0021876 A1 | * | 4/2000 | ............. B65D 25/42 |
| WO | WO 2015081021 A1 | * | 6/2015 | ........... B67D 7/0288 |

OTHER PUBLICATIONS

Design U.S. Appl. No. 29/489,960, filed May 5, 2014.
Design U.S. Appl. No. 29/489,976, filed May 5, 2014.

*Primary Examiner* — James M Hewitt, II
(74) *Attorney, Agent, or Firm* — Craig R. Miles; CR Miles P.C.

(57) ABSTRACT

A conversion fitting configured to matingly engage with a conduit coupler having conduit coupler thread configured as American Standard hose coupling thread or American Standard hose coupling thread for garden hose applications and a container aperture element having container aperture element internal thread configured as bunghole thread to facilitate the transfer of fluid therebetween.

16 Claims, 10 Drawing Sheets

(56) References Cited

U.S. PATENT DOCUMENTS

| | | | | |
|---|---|---|---|---|
| 3,674,179 | A | * | 7/1972 | Galloway ............ B67D 1/0835 |
| | | | | 222/464.2 |
| 5,186,365 | A | * | 2/1993 | Nolte .................... B05B 15/005 |
| | | | | 137/320 |
| 5,190,072 | A | * | 3/1993 | McAnally ............... F16K 17/04 |
| | | | | 137/454.5 |
| 5,462,317 | A | * | 10/1995 | Keller ............... B05C 17/00506 |
| | | | | 222/566 |
| 5,472,025 | A | * | 12/1995 | Conrad ................. B65B 39/007 |
| | | | | 141/331 |
| 6,547,159 | B1 | * | 4/2003 | Westby ................... B05B 15/06 |
| | | | | 239/204 |
| 6,971,390 | B1 | | 12/2005 | Vasek et al. |
| D570,457 | S | | 6/2008 | Brown |
| 7,806,139 | B2 | | 10/2010 | Packham et al. |

\* cited by examiner

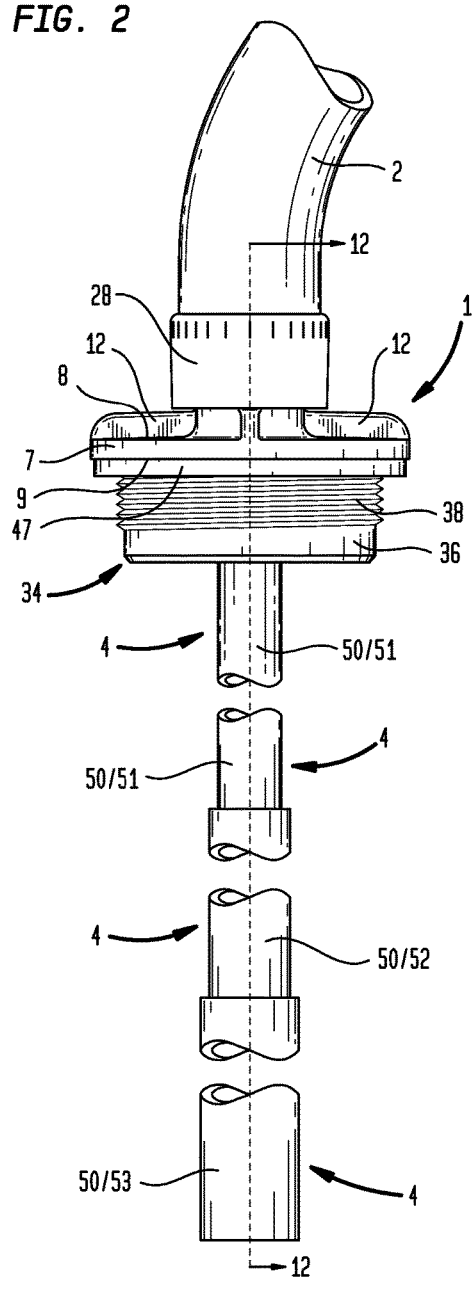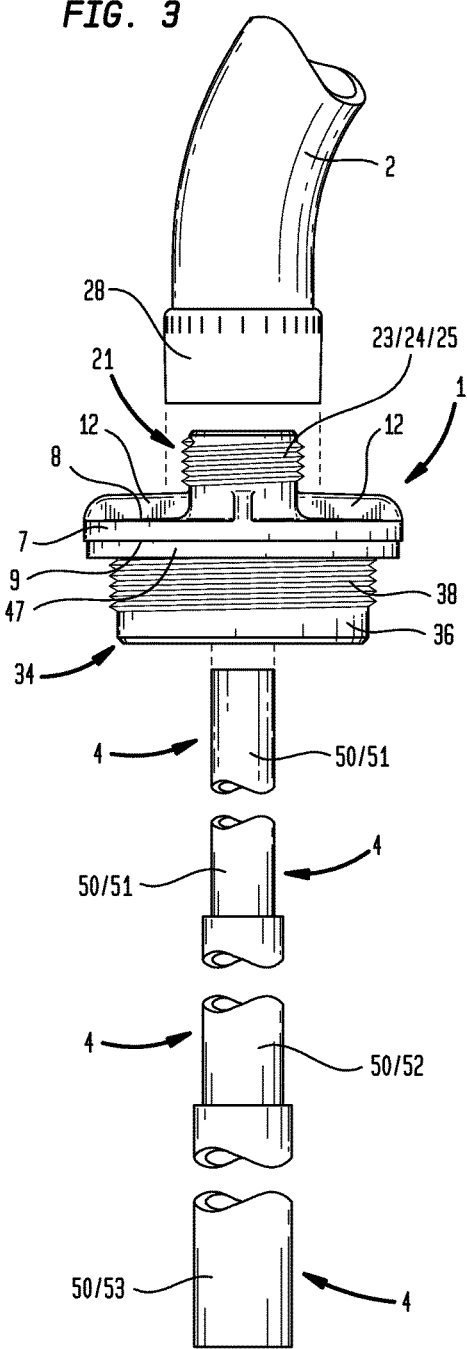

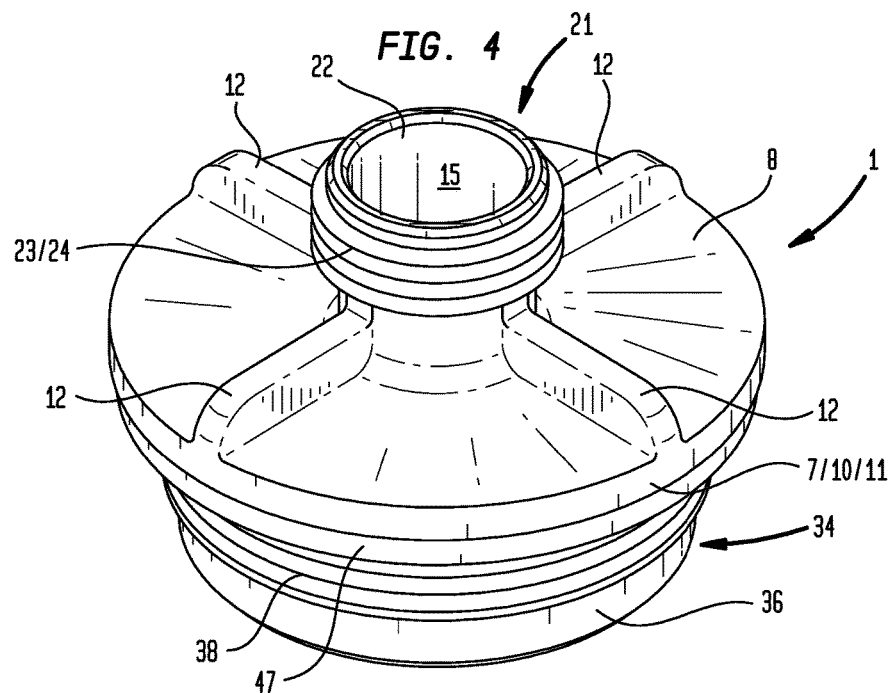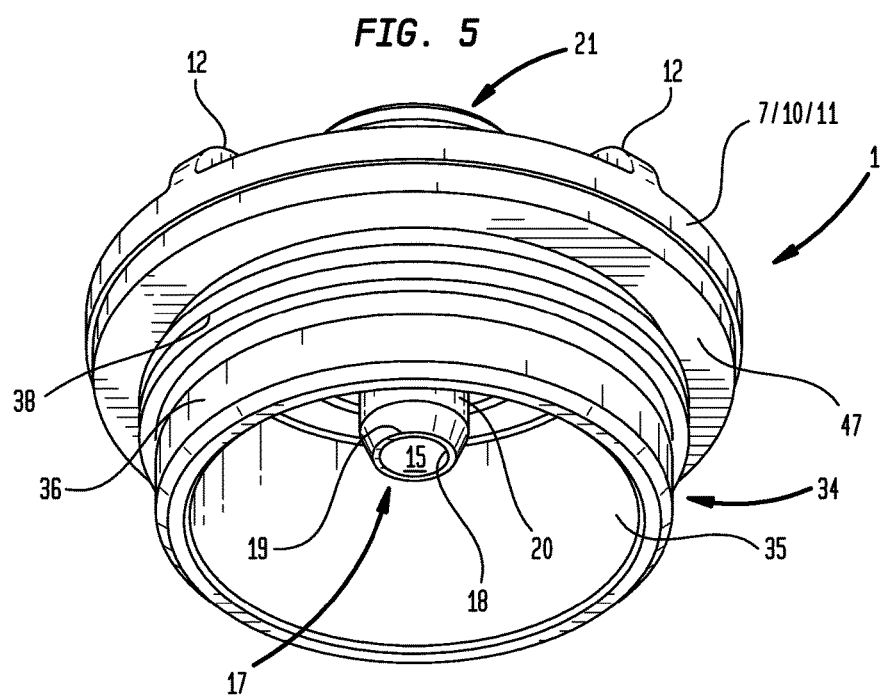

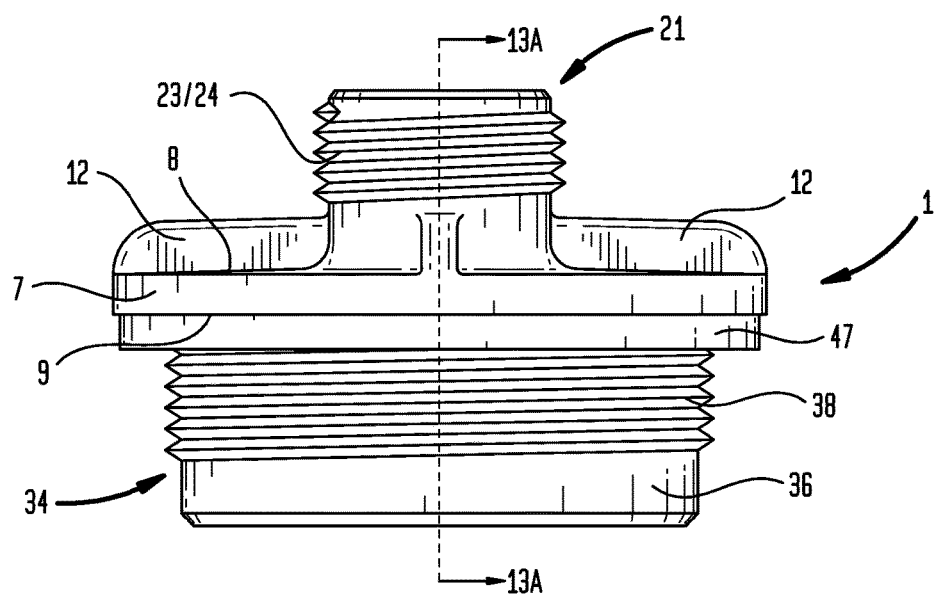
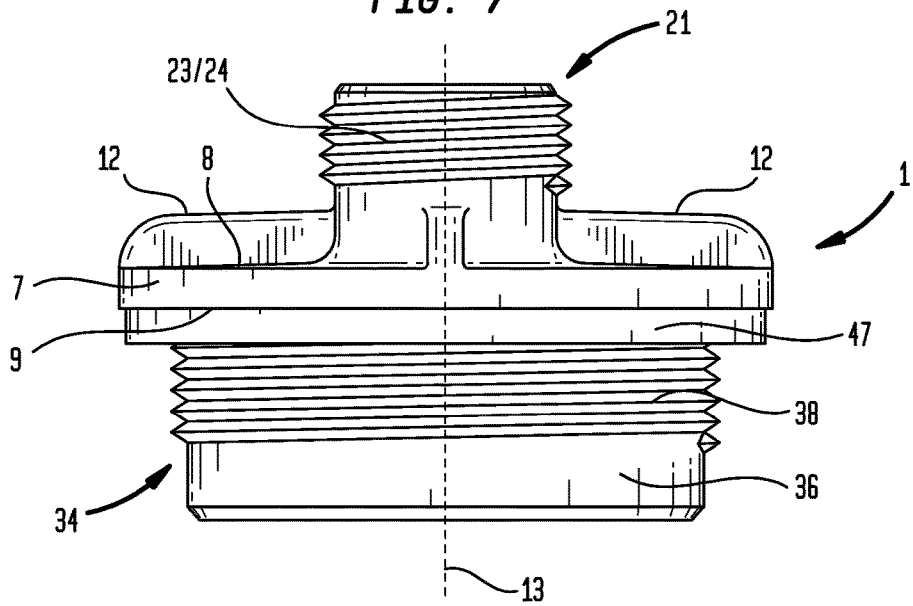

CONVERSION FITTING

This United States Non-Provisional Patent Application claims the benefit of U.S. Design patent application No. 29/489,960, filed May 5, 2014, now Pat. No. D741593, and U.S. Design patent application No. 29/489,976, filed May 5, 2014, now Pat. No. D733847, each hereby incorporated by reference herein.

I. BACKGROUND OF THE INVENTION

Transferring fluids into and out of relatively large containers may present a challenge, as conventional couplers may not provide a means for coupling the container with an inlet or outlet conduit. Thus, there would be a substantial advantage in providing a conversion fitting and a method of producing and using a conversion fitting which can fluidicly couple a conduit, for example a garden hose, to a container, for example a drum, to facilitate the transfer of fluid therebetween.

II. SUMMARY OF THE INVENTION

A broad object of particular embodiments of the invention can be to provide a conversion fitting including a body having a body upper face opposite a body lower face; an aperture element defining a passage between the body upper face and the body lower face; an upper annular member having an upper annular member thread, the upper annular member coupled to the body upper face about the aperture element; and a lower annular member having a lower annular member external thread, the lower annular member coupled to the body lower face about the aperture element.

Another broad object of particular embodiments of the invention can be to provide a conversion fitting whereby the upper annular member thread can be configured to matingly engage with a conduit coupler coupled to a conduit, the conduit coupler having a conduit coupler thread configured as American National Standards Institute ("ANSI") hose coupling thread.

Another broad object of particular embodiments of the invention can be to provide a conversion fitting whereby the lower annular member external thread can be configured to matingly engage with a container aperture element disposed within a container, the container aperture element having a container aperture element internal thread configured as bunghole thread.

Another broad object of particular embodiments of the invention can be to provide a conversion fitting further including a tubular stem extending from the body lower face about said aperture element, whereby the aperture element and a tubular stem internal surface of the tubular stem define the passage between the body upper face and a terminal end of the tubular stem.

Another broad object of particular embodiments of the invention can be to provide a conversion fitting further including a telescoping tubular member having a telescoping tubular member first end configured to sealably engage in fixed relation with the tubular stem to fluidicly couple a tubular member passage with the passage communicating between the body upper face and the terminal end of the tubular stem.

Naturally, further objects of the invention are disclosed throughout other areas of the specification, drawings, and claims.

III. BRIEF DESCRIPTION OF THE DRAWINGS

FIG. 2 is a perspective view of a particular embodiment of the conversion fitting.

FIG. 3 is an exploded view of a particular embodiment of the conversion fitting.

FIG. 4 is a perspective view of a particular embodiment of the conversion fitting.

FIG. 5 is a perspective view of a particular embodiment of the conversion fitting.

FIG. 6 is a first end view of a particular embodiment of the conversion fitting.

FIG. 7 is a second end view of a particular embodiment of the conversion fitting.

IV. DETAILED DESCRIPTION OF THE INVENTION

Figure 1A:
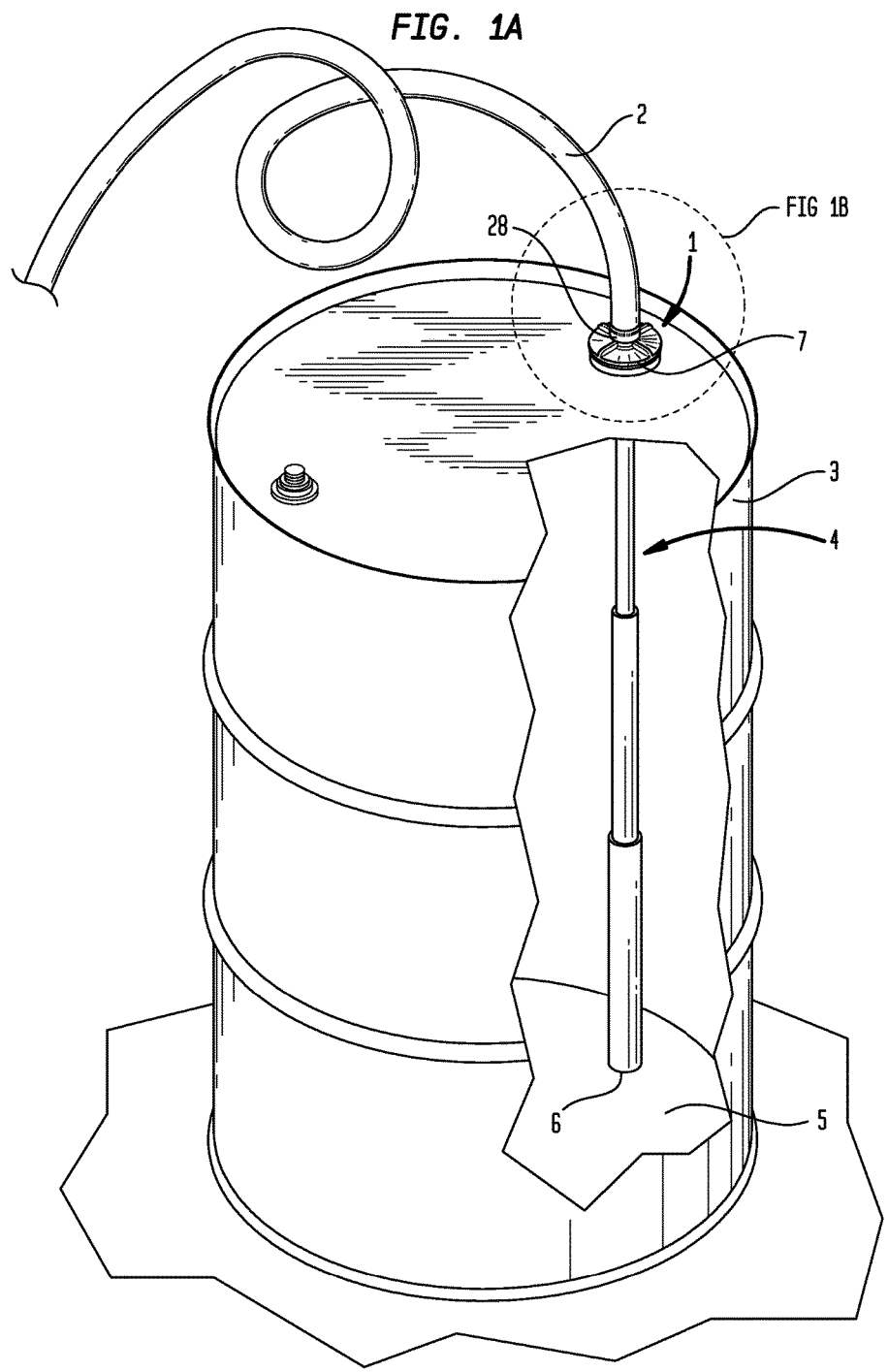
FIG. 1A is an illustration of a method of using a particular embodiment of the conversion fitting.
Figure 1B:
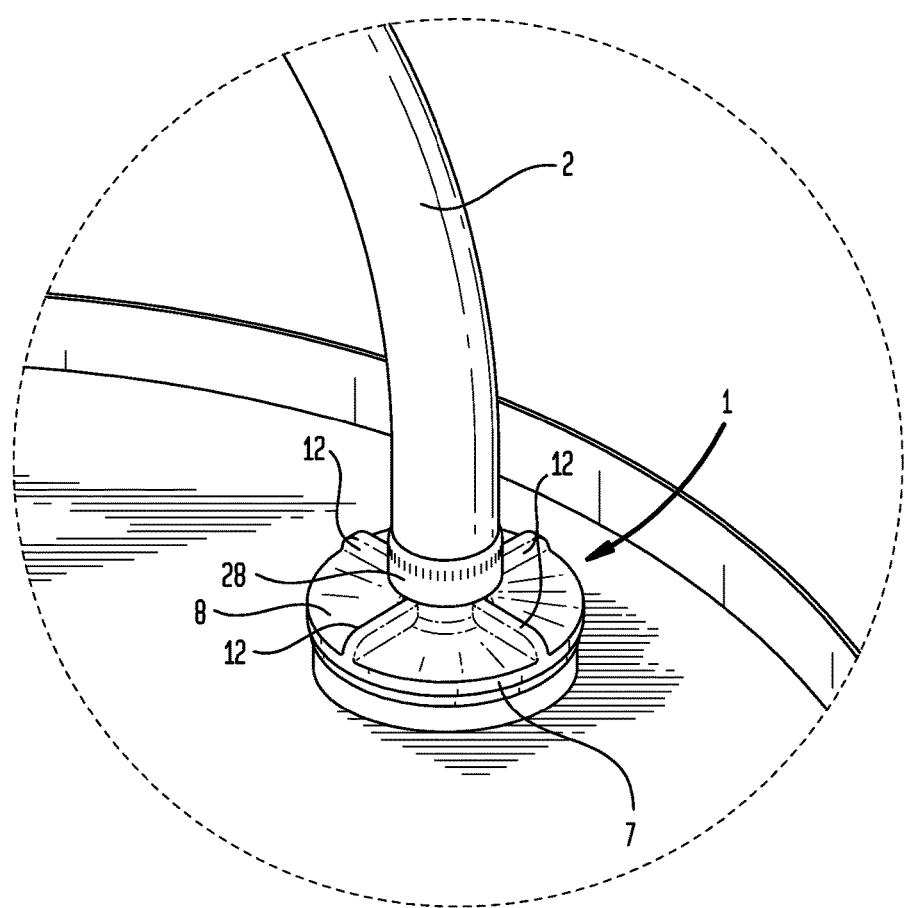
FIG. 1B is an enlargement of a portion of the particular embodiment of the conversion fitting shown in FIG. 1A.
Figure 8:
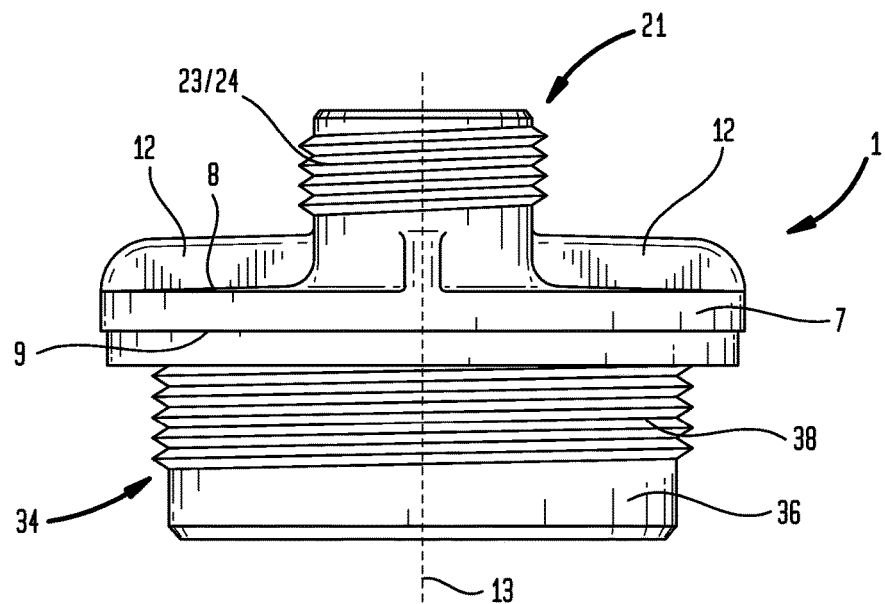
FIG. 8 is a first side view of a particular embodiment of the conversion fitting.
Figure 9:
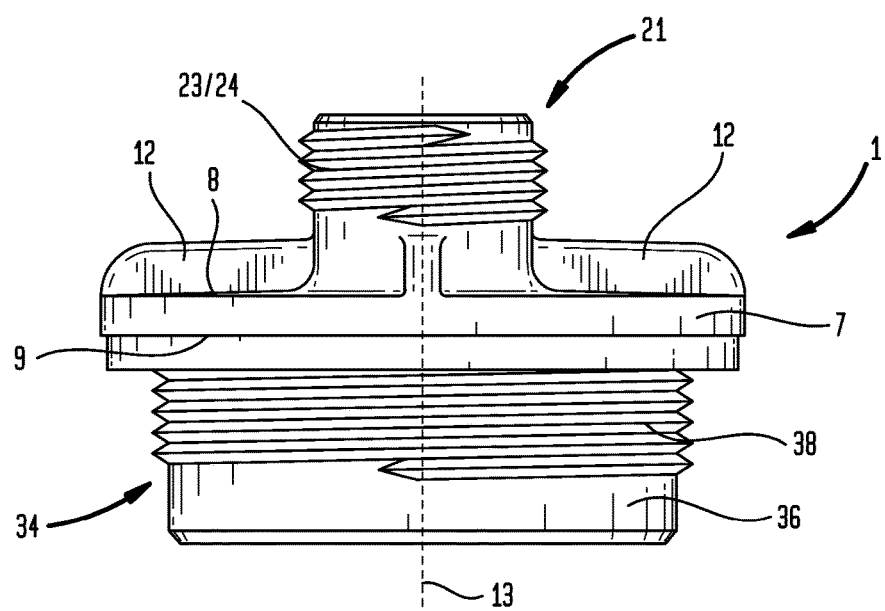
FIG. 9 is a second side view of a particular embodiment of the conversion fitting.

Now referring primarily to FIG. 1A and FIG. 1B, which illustrates a general overview of a particular embodiment of a conversion fitting (1) which can be coupled to a conduit (2) and a container (3) to facilitate the transfer of fluid therebetween. As to particular embodiments, a telescoping tubular member (4) can be coupled to the conversion fitting (1) proximate the container (3), which can further facilitate the transfer of fluid between the container (3), particularly fluid disposed within a container bottom (5) proximate a telescoping tubular member second end (6), and the conduit (2).

Now referring primarily to FIG. 2 through FIG. 11, the conversion fitting (1) can include a body (7) having a body upper face (8) opposite a body lower face (9), each extending radially outward to an outer edge (10) which defines a body periphery (11). The body periphery (11) can be configured in any of a numerous and wide variety of configurations having varying dimensions which allow coupling of a conduit (2) proximate the body upper face (8) and a container (3) proximate the body lower face (9). As an illustrative example, the body periphery (11) can be generally circular as shown in the exemplary embodiments; however, embodiments need not be so limited and can include a body periphery (11) which can be oval or define a polygon, such as a hexagon, pentagon, square, rectangle, triangle, or the like, or combinations thereof.

Again referring primarily to FIG. 2 through FIG. 11, the body upper and lower faces (8)(9) can be generally planar to facilitate coupling or sealing to the conduit (2) or the container (3) as shown in the exemplary embodiments; however, the body upper and lower faces (8)(9) need not be so limited and as to particular embodiments, the body upper face (8) or the body lower face (9) can in part or in whole be concave or convex depending upon the application.

Again referring primarily to FIG. 2 through FIG. 11, one or more protuberances (12) can extend outward from the body upper face (8). The protuberances (12) can be configured to facilitate gripping of or forcible urging upon the body (7) to couple or uncouple the conversion fitting (1) to or from the conduit (2) or the container (3). As an illustrative example, a plurality of protuberances (12) can be coupled to the body upper face (8) in raised radial spaced-apart relation about a central body axis (13) extending toward the body periphery (11), which can facilitate rotatable coupling of the conversion fitting (1) to the conduit (2) or the container (3). However, this example is not intended to limit embodiments solely to raised protuberances (12) and particular embodiments can include recesses or depressions disposed in the body upper face (8) configured to facilitate gripping or forcible urging upon the body (7).

Figure 10:
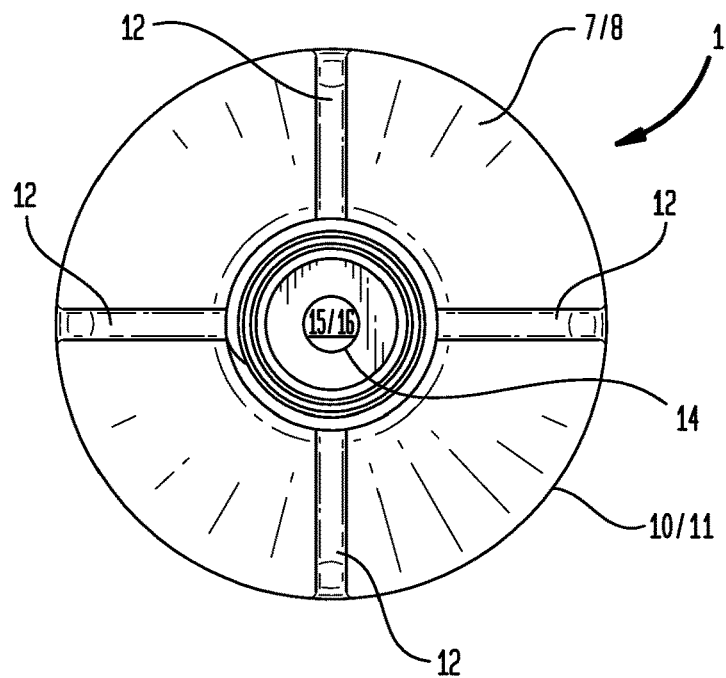
FIG. 10 is a top view of a particular embodiment of the conversion fitting.
Figure 11:
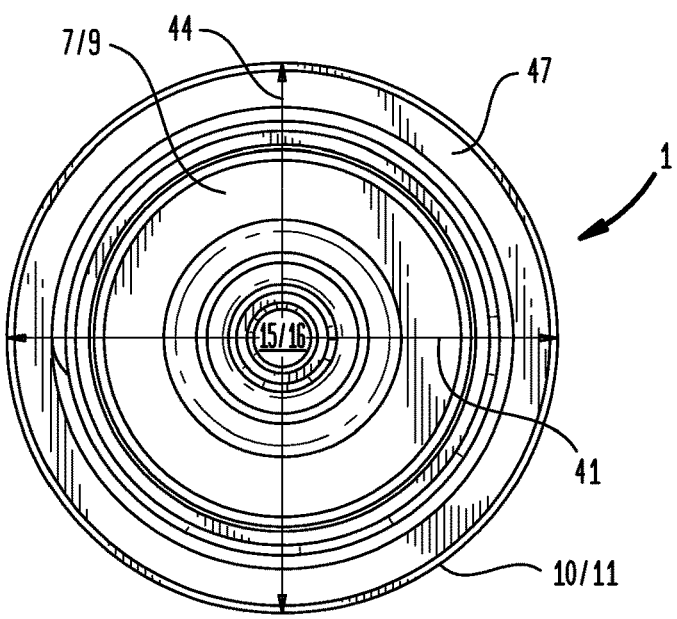
FIG. 11 is a bottom view of a particular embodiment of the conversion fitting.
Figure 12:
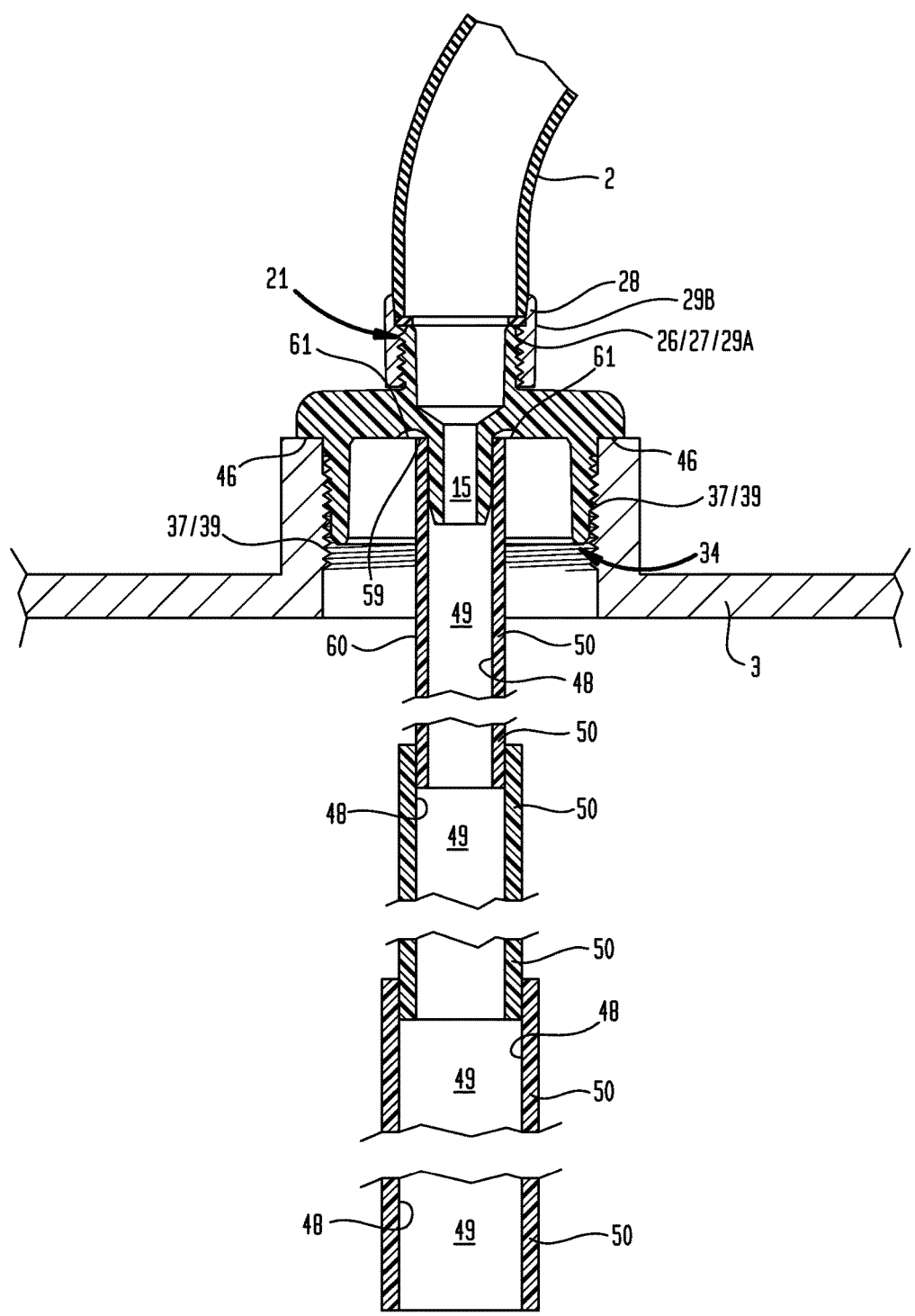
FIG. 12 is a cross-sectional view 12-12 of the particular embodiment of the conversion fitting shown in FIG. 2.

Now referring primarily to FIG. 10 through FIG. 12, particular embodiments of the conversion fitting (1) can include an aperture element (14) communicating between the body upper face (8) and the body lower face (9). The one or more aperture elements (14) can be disposed within the body (7) to define a corresponding one or more passages (15) through which a fluid can flow between the body upper face (8) and the body lower face (9). As an illustrative example, the aperture element (14) can be disposed within the body (7) surrounding the central body axis (13).

Again referring primarily to FIG. 10 through FIG. 12, the one or more aperture elements (14) can be configured in any of a numerous and wide variety of configurations having varying dimensions suitable to allow fluid to flow through the passage (15) between the body upper face (8) and the body lower face (9) at a desired flow rate. As an illustrative example, the aperture element (14) can be generally circular; however, embodiments need not be so limited and embodiments of the aperture element (14) can be oval or define a polygon, such as a hexagon, pentagon, square, rectangle, triangle, or the like, or combinations thereof, to define a passage (15) between the body upper face (8) and the body lower face (9) through which fluid can flow at a correspondingly numerous and wide variety of flow rates, with an aperture element (14) having a lesser aperture element area (16) typically permitting fluid to flow through the passage (15) at a lesser rate than an aperture element (14) having a greater aperture element area (16) typically permitting fluid to flow through the passage (15) at a greater rate.

Now referring primarily to FIG. 5, FIG. 11, and FIG. 12, particular embodiments of the conversion fitting (1) can further include a tubular stem (17) extending from the body lower face (9) about the aperture element (14). The aperture element (14) and a tubular stem internal surface (18) can define the passage (15) between the body upper face (8) and a terminal end (19) of the tubular stem (17). The tubular stem (17) can extend from any of a numerous and wide variety of various locations on the body lower face (9) which provide a passage (15) through which fluid can flow between the body upper face (8) and the terminal end (19) of the tubular stem (17). As an illustrative example, the aperture element (14) can be disposed within the body (7) with the tubular stem (17) extending from the body lower face (9) coincident about the central body axis (13).

Again referring primarily to FIG. 5, FIG. 11, and FIG. 12, as with the aperture element (14), the tubular stem internal surface (18) can be configured in any of a numerous and wide variety of configurations having varying dimensions suitable to allow fluid to flow through the passage (15) at a desired flow rate. As an illustrative example, the tubular stem internal surface (18) can be generally cylindrical, communicating with a generally circular aperture element (14) to define a generally cylindrical passage (15). As to particular embodiments, a tubular stem external surface (20) can be configured in generally adjacent parallel relation to the tubular stem internal surface (18); as such, a tubular stem (17) including a generally cylindrical tubular stem internal surface (18) can have a generally cylindrical tubular stem external surface (20). As to particular embodiments, the tubular stem external surface (20) can inwardly taper toward the terminal end (19) to facilitate coupling with a tubular member (4).

Now referring primarily to FIG. 3 through FIG. 12, particular embodiments of the conversion fitting (1) can include an upper annular member (21) coupled to the body upper face (8) about the aperture element (14). The upper annular member (21) can be coupled to the body upper face (8) at a location which allows the upper annular member (21) to couple to a conduit (2) and to receive fluid delivered through the passage (15). As an illustrative example, the upper annular member (8) can be coupled about an aperture element (14) surrounding the central body axis (13). As to particular embodiments, the upper annular member (21) and the aperture element (14) can be axially disposed within body (7) coincident about the central body axis (13).

Again referring primarily to FIG. 3 through FIG. 12, the upper annular member (21) can include an upper annular member internal surface (22) and an upper annular member external surface (23). The upper annular member internal and external surfaces (22)(23) can be configured in any of a numerous and wide variety of configurations to couple to a correspondingly numerous and wide variety of conduits (2) and to allow fluid to flow through the passage (15) communicating between the body upper face (8) and the body lower face (9). As an illustrative example, the upper annular member internal and external surfaces (22)(23) can define a generally cylindrical upper annular member (21) configured to matingly engage a generally cylindrical conduit (2).

Again referring primarily to FIG. 3 through FIG. 12, the upper annular member (21) can further include an upper annular member thread (24), which can be coupled to the upper annular member internal surface (22) or the upper annular member external surface (23). As to particular embodiments, the upper annular member thread (24), whether male thread (25) or female thread (26), can be configured to matingly engage with a corresponding male thread (25) or female thread (26), for example conduit coupler thread (27) of a conduit coupler (28). The upper annular member thread (24) can be, but is not necessarily, configured to matingly engage American National Standards Institute ("ANSI") hose coupling thread whether American Standard hose coupling thread ("NH") or American Standard hose coupling thread for garden hose applications ("NHR"). As an illustrative example, the upper annular member (21) can have upper annular member thread (24) configured as male thread (25) coupled to the upper annular member external surface (23) which can matingly engage with conduit coupler thread (27) configured as female thread (26) coupled to a conduit coupler internal surface (29A).

Now referring primarily to FIGS. 2, 3 and 12, the conduit coupler (28) can include a conduit coupler internal surface (29A) or a conduit coupler external surface (29B) having a conduit coupler thread (27) configured to rotatingly engage the upper annular member thread (24) to secure the conduit coupler (28) to the upper annular member (21) of the conversion fitting (1). The conduit coupler thread (27) can be, but is not necessarily, configured to matingly engage ANSI hose coupling thread whether NH or NHR.

Figure 13A:
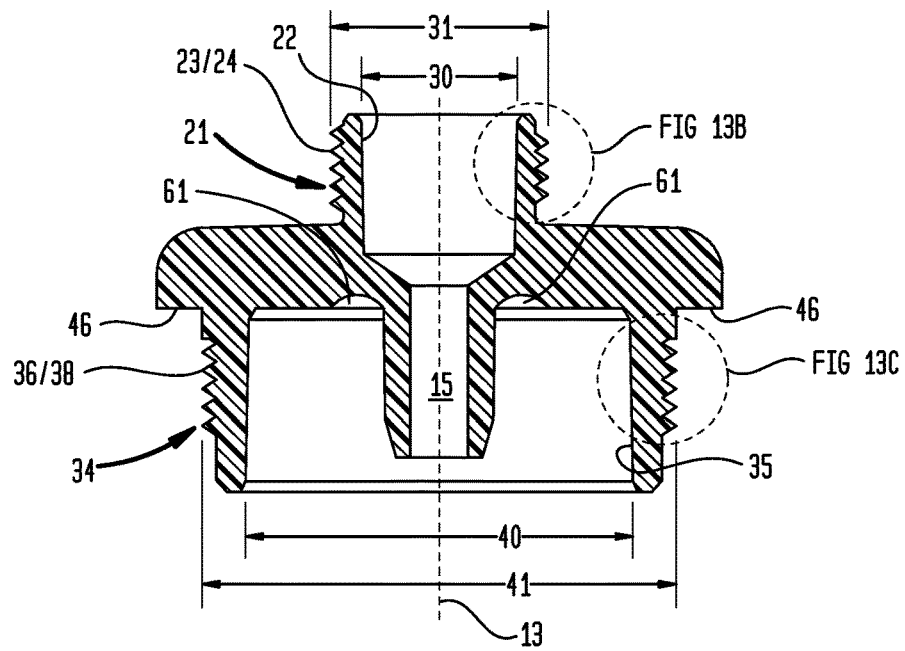
FIG. 13A is a cross-sectional view 13A-13A of the particular embodiment of the conversion fitting shown in FIG. 6.
Figure 13B:
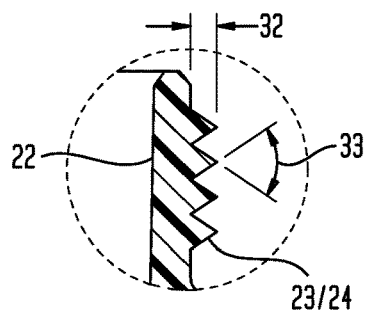
FIG. 13B is an enlargement of a portion of the cross-sectional view 13A-13A of the particular embodiment of the conversion fitting shown in FIG. 6.
Figure 13C:
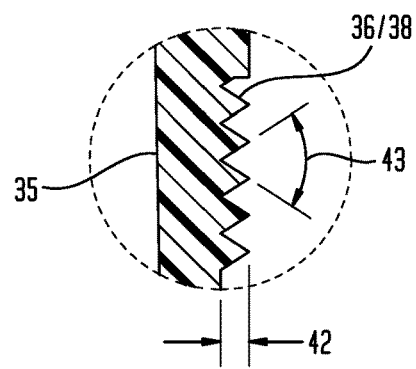
FIG. 13C is an enlargement of a portion of the cross-sectional view 13A-13A of the particular embodiment of the conversion fitting shown in FIG. 6.
Figure 14A:
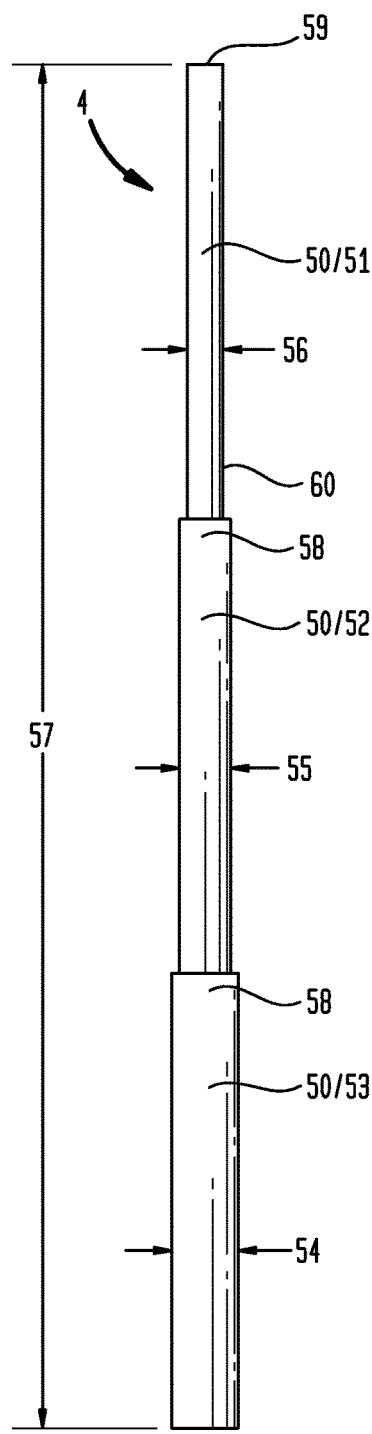
FIG. 14A is a side view of a particular embodiment of the telescoping tubular member.
Figure 14B:
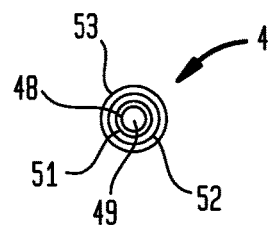
FIG. 14B is a top view of a particular embodiment of the telescoping tubular member.
Figure 14C:
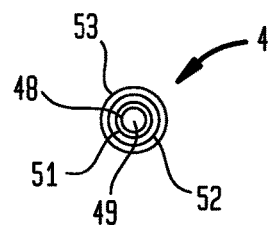
FIG. 14C is a bottom view of a particular embodiment of the telescoping tubular member.

Now referring primarily to FIG. 13A through FIG. 13C, the conduit coupler thread (27) can be configured to provide 0.75-11.5 NH or 0.75-11.5 NHR. Accordingly, the upper annular member internal surface (22) or the upper annular member external surface (23) can be correspondingly threaded NH or NHR. As to particular embodiments having the upper annular member external surface (23) threaded NH or NHR, the upper annular member (21) can have an upper annular member internal diameter (30) of about 0.75 inches (about 19.03 millimeters), an upper annular member external diameter (31) of about 1.052 inches (about 26.72 millimeters), an upper annular member thread height (32) of about 0.051 inches (about 1.3 millimeters), and an upper annular member thread angle (33) of about 60 degrees.

As to other particular embodiments, the upper annular member thread (24) can be configured to matingly engage with a conduit coupler thread (27) configured as a British standard pipe ("BSP") thread.

Now referring primarily to FIG. 2 through FIG. 12, particular embodiments of the conversion fitting (1) can include a lower annular member (34) coupled to the body lower face (9) about the tubular stem (17). The lower annular member (9) can be coupled to the body lower face (9) in any location which allows the lower annular member (9) to couple to a container (3) and fluid to flow through the passage (15). As an illustrative example, the lower annular member (34) can be coupled about the tubular stem (17) extending from the body lower face (9) about a central body axis (13). As an illustrative example, the lower annular member (34) can define a generally cylindrical lower annular member ( ).

Again referring primarily to FIG. 2 through FIG. 12, the lower annular member (34) can include a lower annular member internal surface (35) and a lower annular member external surface (36) which can be configured in generally adjacent parallel relation. The lower annular member internal and external surfaces (35)(36) can be configured in any of a numerous and wide variety of configurations to couple to a correspondingly wide variety of container aperture elements (37) disposed within containers (3) and to allow fluid to flow through the passage (15) communicating between the body upper face (8) and the body lower face (9). As an illustrative example, the lower annular member internal and external surfaces (35)(36) can define a generally cylindrical lower annular member (34) configured to matingly engage a generally cylindrical container aperture element (37).

Again referring primarily to FIG. 2 through FIG. 12, the lower annular member (34) can have a lower annular member external thread (38), which can facilitate coupling with the container aperture element (37). As an illustrative example, the lower annular member external thread (38) can matingly engage with a container aperture element (37) having a corresponding container aperture element internal thread (39) by rotatingly engaging the lower annular member external thread (38) with the container aperture element internal thread (39). As such, the lower annular member (34) of the conversion fitting (1) can be securely coupled to the container (3).

As to particular embodiments, the lower annular member external thread (38), or male thread (25), can be configured to matingly engage with a container aperture element internal thread (39), or female thread (26), configured as bunghole thread (fine bunghole thread or coarse bunghole thread), such as 55-gallon (200 liter) drum bunghole thread. As an illustrative example, the container aperture element internal thread (39) can be configured as 2-11.5 American Standard straight pipe for hose coupling thread ("NPSH"). Accordingly, the lower annular member external thread (38) can be correspondingly threaded NPSH. As to these particular embodiments, the lower annular member (34) have a lower annular member internal diameter (40) of about 1.919 inches (about 48.75 millimeters), a lower annular member external diameter (41) of about 2.313 inches (about 58.74 millimeters), a lower annular member thread height (42) of about 0.066 inches (about 1.68 millimeters), and a lower annular member thread angle (43) of about 60 degrees.

Now referring primarily to FIG. 5 and FIG. 11, particular embodiments of the conversion fitting (1) can further include a generally circular body periphery (11) having a body periphery diameter (44) which can be greater than a lower annular member external diameter (41) of a generally cylindrical lower annular member (34) to provide a retaining flange (46), which can preclude the body (7) from passing through the container aperture element (37) and into the container (3).

Now referring primarily to FIG. 2 through FIG. 9, and FIG. 12, particular embodiments of the conversion fitting (1) can further include an annular gasket (47) which can be disposed about the lower annular member (34) adjacent to the retaining flange (46). When the conversion fitting (1) couples to a container (3), the annular gasket (37) can provide a seal between the retaining flange (46) of the conversion fitting (1) and the container (3) (as shown in the example of FIG. 1A and FIG. 1B).

Now referring primarily to FIG. 1A through FIG. 3 and FIG. 13A through FIG. 13C, particular embodiments of the conversion fitting (1) can further include a telescoping tubular member (4) having a telescoping tubular member internal surface (48) which can define a tubular member passage (49). The tubular member passage (49) can be configured in any of a numerous and wide variety of configurations suitable to allow fluid to flow through the tubular member passage (49) at a desired flow rate. As an illustrative example, the telescoping tubular member internal surface (48) can be generally cylindrical, defining a generally cylindrical tubular member passage (49).

The telescoping tubular member (4) can include two or more telescoping tubular elements (50), which can be telescopingly engaged. As an illustrative example, the telescoping tubular member (4) can include telescopingly engaged first, second and third telescoping tubular elements (51)(52)(53). As to particular embodiments, a third telescoping tubular element diameter (54) can be greater than a second telescoping tubular element diameter (55), which can be greater than a first telescoping tubular element diameter (56). As such, the first telescoping tubular element (51) can be telescopingly received within the second telescoping tubular element (52) and the second telescoping tubular element (52) can be telescopingly received within the third telescoping tubular element (53). A telescoping tubular member length (57) can be telescopingly adjustable, having a greater telescoping tubular member length (57) when the telescoping tubular elements (51)(52)(53) are extended (the "extended condition") and a lesser telescoping tubular member length (57) when the telescoping tubular elements (51)(52)(53) are retracted within one another (the "retracted condition"). As to particular embodiments, the telescoping tubular elements (51)(52)(53) can include one or more catch elements (58), which can preclude the telescoping tubular elements (51)(52)(53) from becoming disengaged from one another. As an illustrative example, the catch element (58) can include frictional forces.

Again referring primarily to FIG. 1A through FIG. 3 and FIG. 13A through FIG. 13C, the tubular member passage (49) of the telescoping tubular member (4) can be fluidicly coupled to the passage (15) communicating between the body upper face (8) and the terminal end (19) of the tubular stem (17) to facilitate the transfer of fluid between the container (3) and the body upper face (8) or to a conduit (2) coupled to the upper annular member (21). The telescoping tubular member (4) can have a telescoping tubular member length (57) in the extended condition which disposes the telescoping tubular member second end (6) proximate or in contact with the container bottom (5).

Now referring primarily to FIG. 12, a telescoping tubular member first end (59) can be configured to sealably engage in fixed relation with the tubular stem (17) to fluidicly couple the tubular member passage (49) with the passage (15) communicating between the body upper face (8) and the terminal end (19) of the tubular stem (17). As to particular embodiments, the tubular stem internal surface (18) can engage a telescoping tubular member external surface (60) proximate the telescoping tubular member first end (59). As to other particular embodiments, the telescoping tubular member internal surface (48) proximate the telescoping tubular member first end (59) can be engaged about the tubular stem external surface (20).

Now referring primarily to FIG. 11, the body lower face (9) can further include an annular recess (61) about the tubular stem (17) which can receive the telescoping tubular member first end (59) to further secure the telescoping tubular member first end (59) to the tubular stem external surface (20).

A method of producing particular embodiments of the conversion fitting (1) can include providing a body (7) having a body upper face (8) opposite a body lower face (9); disposing an aperture element (14) in the body (7) to define a passage (15) between the body upper face (8) and the body lower face (9); coupling an upper annular member (21) to the body upper face (8) about the aperture element (14), the upper annular member (21) having an upper annular member thread (24); and coupling a lower annular member (34) to the body lower face (9) about the aperture element (14), the lower annular member (9) having a lower annular member external thread (38).

As to particular embodiments, the method of producing particular embodiments of the conversion fitting (1) can further include providing a body upper face (8) and a body lower face (9) which extend radially outward to an outer edge (10) defining a body periphery (11) having a generally circular configuration.

As to particular embodiments, the method of producing particular embodiments of the conversion fitting (1) can further include providing the upper annular member (21) having upper annular member thread (24) configured to couple to a conduit coupler (28) having a conduit coupler thread (27), the upper annular member thread (24) configured to matingly engage with conduit coupler thread (27) selected from the group consisting of: American Standard hose coupling thread and American Standard hose coupling thread for garden hose applications. As to particular embodiments, the method of producing particular embodiments of the conversion fitting (1) can further include configuring the upper annular member thread (24) to matingly engage with conduit coupler thread (27) configured as 0.75-11.5 NHR. As to particular embodiments having the upper annular member external surface (23) threaded NH or NHR, the upper annular member (21) can have an upper annular member internal diameter (30) of about 0.75 inches (about 19.03 millimeters), an upper annular member external diameter (31) of about 1.052 inches (about 26.72 millimeters), an upper annular member thread height (32) of about 0.051 inches (about 1.3 millimeters), and an upper annular member thread angle (33) of about 60 degrees.

As to particular embodiments, the method of producing particular embodiments of the conversion fitting (1) can further include providing the lower annular member (34) having lower annular member external thread (38) configured to couple to a container aperture element (37) having a container aperture element internal thread (39), the lower annular member external thread (38) configured to matingly engage with container aperture element internal thread (39) configured as bunghole thread. As to particular embodiments, the method of producing particular embodiments of the conversion fitting (1) can further include configuring the lower annular member external thread (38) to matingly engage with container aperture element internal thread (39) configured as 2-11.5 American Standard straight pipe for hose coupling thread. As to particular embodiments, the lower annular member (34) can have a lower annular member internal diameter (40) of about 1.919 inches (about 48.75 millimeters), a lower annular member external diameter (41) of about 2.313 inches (about 58.74 millimeters), a lower annular member thread height (42) of about 0.066 inches (about 1.68 millimeters), and a lower annular member thread angle (43) of about 60 degrees.

As to particular embodiments, the method of producing particular embodiments of the conversion fitting (1) can further include providing the body (7) having a body periphery diameter (44) greater than a lower annular member external diameter (41) defining a retaining flange (46).

As to particular embodiments, the method of producing particular embodiments of the conversion fitting (1) can further include disposing an annular gasket (47) about the lower annular member (34) adjacent to the retaining flange (46).

As to particular embodiments, the method of producing particular embodiments of the conversion fitting (1) can further include joining a tubular stem (17) to extend from the body lower face (9) about the aperture element (14), the aperture element (14) and a tubular stem internal surface (18) of the tubular stem (17) defining the passage (15) between the body upper face (8) and a terminal end (19) of the tubular stem (17). As to particular embodiments, the passage (15) can surround a central body axis (13) of the body (7).

As to particular embodiments, the method of producing particular embodiments of the conversion fitting (1) can further include providing a telescoping tubular member (4) having a telescoping tubular member first end (59) configured to sealably engage the tubular stem (17) to fluidicly couple a tubular member passage (49) with the passage (15) communicating between the body upper face (8) and the terminal end (19) of the tubular stem (17). As to particular embodiments, the telescoping tubular member (4) can include a plurality of telescoping tubular elements (50)

telescopingly engaged. As to particular embodiments, the telescoping tubular member (4) can have a telescoping tubular member length (57) capable of disposing a telescoping tubular member second end (6) proximate a container bottom (5). As to particular embodiments, at least one of the telescoping tubular elements (50) can include a catch element.

As to particular embodiments, the method of producing particular embodiments of the conversion fitting (1) can further include disposing an annular recess (61) in the lower body surface (9), the annular recess (61) configured to receive the telescoping tubular member first end (59).

As to particular embodiments, components of the conversion fitting (1) can be entirely formed of the same material, or alternatively, various components of the conversion fitting (1) can be formed from different materials. As to particular embodiments, components of the conversion fitting (1) can be produced from any of a wide variety of materials which can provide a conversion fitting (1) capable of being coupled to a conduit (2) and a container (3) to facilitate the transfer of fluid there between. As in illustrative example, materials can include or consist of: metal, wood, rubber, rubber-like material, plastic, plastic-like material, acrylic, polyamide, polyester, polypropylene, polyvinyl chloride-based materials, silicone-based materials, or the like, or combinations thereof.

As to particular embodiments, the conversion fitting (1) or components of the conversion fitting (1) can be produced from any of a wide variety of processes depending upon the application, such as press molding, injection molding, fabrication, machining, printing, three-dimensional printing, or the like, or combinations thereof, as one piece or assembled from a plurality of pieces into an embodiment of the conversion fitting (1) or provided as a plurality of pieces for assembly into an embodiment of the conversion fitting (1).

There may be one or more advantages to producing an embodiment of the conversion fitting (1) as a one-piece construct as compared to assembling a plurality of pieces into an embodiment of the conversion fitting (1). For example, whereas a conversion fitting (1) assembled from a plurality of pieces can include one or more joints where the plurality of pieces join together to assemble into an embodiment of the conversion fitting (1), a conversion fitting (1) comprising a one-piece construct can be void of these joints, which can be prone to leaking. As an additional example, a conversion fitting (1) comprising a one-piece construct can be produced more easily or at a lesser cost easier than a conversion fitting (1) assembled from a plurality of pieces.

A method of using the conversion fitting (1) to fluidly couple a conduit (2) to a container (3) can include obtaining a conversion fitting (1) including a body (7) having a body upper face (8) opposite a body lower face (9); an aperture element (14) defining a passage (15) between the body upper face (8) and the body lower face (9); an upper annular member (21) having an upper annular member thread (24), the upper annular member (21) coupled to the body upper face (8) about the aperture element (14); and a lower annular member (34) having a lower annular member external thread (38), the lower annular member (34) coupled to the body lower face (9) about the aperture element (14); coupling the upper annular member (21) to a conduit coupler (28) having a conduit coupler thread (27) by matingly engaging the upper annular member thread (24) with the conduit coupler thread (27); and coupling the lower annular member (34) to a container aperture element (37) having a container aperture element internal thread (39) by matingly engaging the lower annular member external thread (38) with the container aperture element internal thread (39).

As can be easily understood from the foregoing, the basic concepts of the present invention may be embodied in a variety of ways. The invention involves numerous and varied embodiments of a conversion fitting and methods for making and using such conversion fittings, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the conversion fittings herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A conversion fitting, comprising:
   a body having a body upper face opposite a body lower face;
   an aperture element defining a passage between said body upper face and said body lower face;
   an upper annular member having an upper annular member thread, said upper annular member coupled to said body upper face about said aperture element;
   a lower annular member having a lower annular member external thread, said lower annular member coupled to said body lower face about said aperture element;
   wherein an upper annular member external diameter is lesser than a lower annular member external diameter; and
   a tubular stem extending from said body lower face about said aperture element, said aperture element and a tubular stem internal surface of said tubular stem defining said passage between said body upper face and a terminal end of said tubular stem;
   wherein said tubular stem is laterally surrounded by said lower annular member; and
   wherein said tubular stem does not extend beyond said lower annular member.

2. The conversion fitting of claim 1, wherein said body upper face and said body lower face extend radially outward to an outer edge defining a body periphery having a generally circular configuration.

3. The conversion fitting of claim 1, wherein said upper annular member thread can be coupled to an upper annular member surface selected from the group consisting of: an upper annular member internal surface and an upper annular member external surface.

4. The conversion fitting of claim 1, wherein said upper annular member has an upper annular member internal diameter of about 0.75 inches (about 19.03 millimeters), an upper annular member external diameter of about 1.052 inches (about 26.72 millimeters), an upper annular member thread height of about 0.051 inches (about 1.3 millimeters), and an upper annular member thread angle of about 60 degrees.

5. The conversion fitting of claim 1, wherein said lower annular member has said lower annular member external thread configured to couple to a container aperture element having a container aperture element internal thread, said lower annular member external thread configured to matingly engage with said container aperture element internal thread configured as a bunghole thread.

6. The conversion fitting of claim 1, wherein said lower annular member has a lower annular member internal diameter of about 1.919 inches (about 48.75 millimeters), a lower annular member external diameter of about 2.313 inches (about 58.74 millimeters), a lower annular member thread height of about 0.066 inches (about 1.68 millimeters), and a lower annular member thread angle of about 60 degrees.

7. The conversion fitting of claim 5, wherein said body has a body periphery diameter greater than a lower annular member external diameter.

8. The conversion fitting of claim 7, further comprising an annular gasket disposed about said lower annular member adjacent to said retaining flange.

9. The conversion fitting of claim 1, wherein said passage surrounds a central body axis of said body.

10. The conversion fitting of claim 9, further comprising a telescoping tubular member having a telescoping tubular member first end configured to sealably engage said tubular stem to fluidicly couple a tubular member passage with said passage communicating between said body upper face and said terminal end of said tubular stem.

11. The conversion fitting of claim 10, wherein said telescoping tubular member comprises a plurality of telescoping tubular elements telescopingly engaged.

12. The conversion fitting of claim 11, wherein said telescoping tubular member has a telescoping tubular member length capable of disposing a telescoping tubular member second end proximate a container bottom.

13. The conversion fitting of claim 12, wherein at least one of said telescoping tubular elements includes a catch element.

14. The conversion fitting of claim 12, further comprising an annular recess disposed in said lower body surface, said annular recess configured to receive said telescoping tubular member first end.

15. A method of producing a conversion fitting, comprising:
   providing a body having a body upper face opposite a body lower face;
   disposing an aperture element in said body to define a passage between said body upper face and said body lower face;
   coupling an upper annular member to said body upper face about said aperture element, said upper annular member having an upper annular member thread; and
   coupling a lower annular member to said body lower face about said aperture element, said lower annular member having a lower annular member external thread;
   wherein an upper annular member external diameter is lesser than a lower annular member external diameter; and
   extending a tubular stem from said body lower face about said aperture element, said aperture element and a tubular stem internal surface of said tubular stem defining said passage between said body upper face and a terminal end of said tubular stem;
   wherein said tubular stem is laterally surrounded by said lower annular member; and
   wherein said tubular stem does not extend beyond said lower annular member.

16. The method of claim 15, further comprising coupling said upper annular member thread to an upper annular member surface selected from the group consisting of: an upper annular member internal surface and an upper annular member external surface.

* * * * *